Dec. 27, 1955  E. J. WALTON ET AL  2,728,323
AUTOMOBILE HEADLIGHT COVER
Filed July 16, 1952

INVENTOR.
EDWARD J. WALTON
AND HOWARD L. GUENTHER
BY Harold C. Boyer
ATTORNEY

United States Patent Office 2,728,323
Patented Dec. 27, 1955

2,728,323

AUTOMOBILE HEADLIGHT COVER

Edward J. Walton and Howard L. Guenther,
Rochester, N. Y.

Application July 16, 1952, Serial No. 299,104

3 Claims. (Cl. 118—505)

This invention relates to an attachment for the headlight assembly of an automobile, and, more particularly to a device adapted to cover the conventional sealed beam unit of the headlight assembly when it is desired to paint the automobile.

Heretofore, as a part of the process of preparing an automobile for a body painting operation, it has been the practice to mask those parts of the body which are not to be painted, such as the windows, the headlights and the various chrome fixtures. The masking operation required a considerable length of time and expense. However, despite the time and expense involved, this operation had to be performed with considerable care so as to prevent the paint, which is usually applied to the automobile body by spraying, from coming into contact with the various masked parts. The masking customarily consisted of applying masking paper to the part to be covered and fastening the paper to the part by means of masking tape. In the case of the headlight assembly, it was the practice to remove the headlight door and then, to wrap masking paper around the sealed beam unit. The masking paper was secured in position by means of extensively applying masking tape so as to insure the covering of the sealed beam unit. Obviously, this latter operation required a considerable expenditure of labor and material.

The principal object of this invention is the provision of a device which can be conveniently mounted to the headlight assembly so that the exposed surface of the sealed beam unit will be effectively covered while the automobile is being painted.

A further object of this invention is the provision of a device which can be quickly and easily mounted to the headlight assembly of an automobile and which is of simple construction so that it can be easily and cheaply manufactured.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein.

Figure 4:
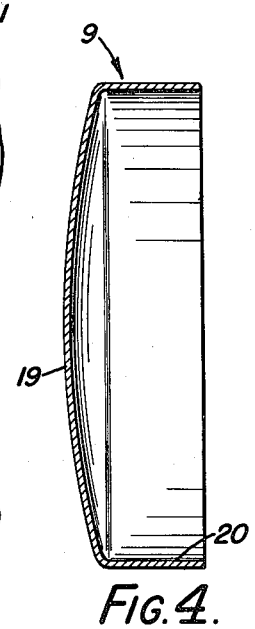
Figure 4 is a cross-sectional side view of the headlight covering device.
Figure 5:
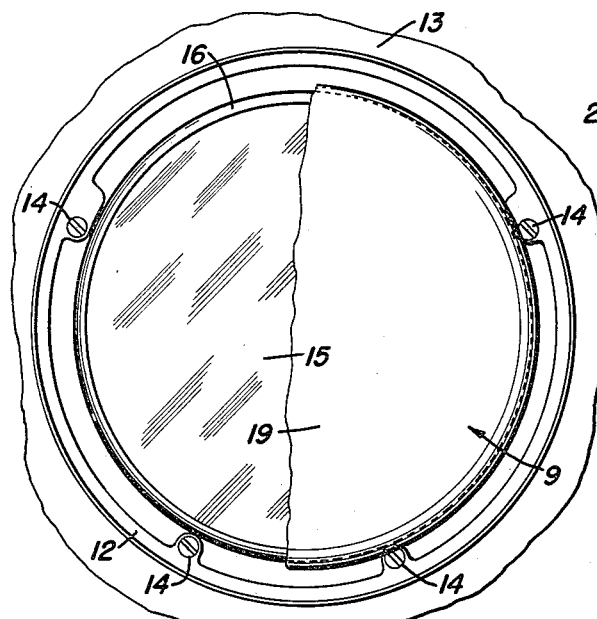
Figure 5 is a front elevational view of the headlight assembly as shown in Figure 2 and showing a partial view of the employment of the novel headlight covering device in its operative position.

This invention comprises generally the headlight cover 9 as shown in Figure 4, which is adapted so as to be conveniently mounted to a conventional headlight assembly, generally designated as 10.

Figure 1:
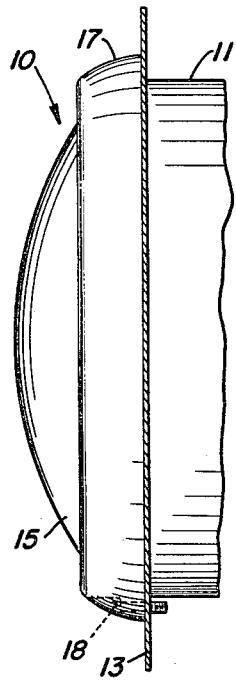
Figure 1 is a fragmentary side view partially in section, of a conventional automobile headlight assembly.
Figure 2:
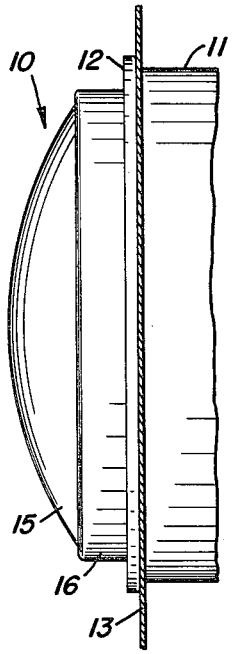
Figure 2 is a view identical to Figure 1 except that the headlight door has been removed.
Figure 3:
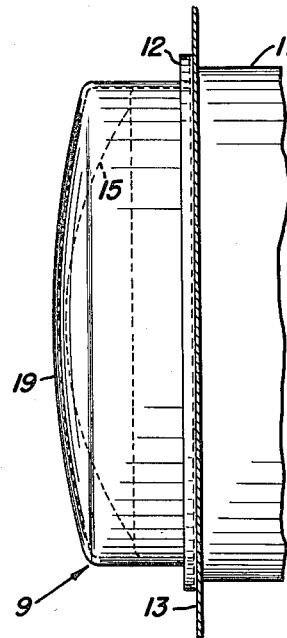
Figure 3 is the headlight assembly as shown in Figure 2 and illustrating the novel device in its operative position.

The headlight assembly which is of conventional design, consists of a housing 11, provided with a flange 12, which is secured to the fender 13 of an automobile by means of screws 14. A sealed beam unit 15 is operatively positioned within the housing 11 and is secured therein by means of a unit retaining ring 16. A headlight door 17 as shown in Figure 1 encloses the unit retaining ring 16 and the flange 12 of the housing 11 and is secured in position by fastening screw 18.

The headlight cover 9 may be constructed of a plastic material or of a suitable compressed paper construction. It is provided with a circular convex top portion 19 which has a configuration complemental to the exposed surface of the sealed beam unit 15. The top portion is of a diameter substantially equal to the outside diameter of the unit retaining ring 16. The cover 9 is provided with a side wall portion 20 which projects from the peripheral edge of the top portion 19 and is integral therewith.

When it is desired to employ the device, such as in the painting operation of an automobile, the headlight door 17 is removed by removing a fastening screw 18. The headlight cover 9 is positioned over the sealed beam unit 15 so that the inside surface of top portion 19 is in contacting relation with the exposed surface of the sealed beam unit 15. The sidewall portion 20 encircles the unit retaining ring 16 and is frictionally engaged to the latter. In this position it will be noted that the free edge of the wall portion 19 abuts the flange 12 of the housing 11. Although this feature is not essential, it is important that the wall portion 19 enclose a substantial portion of the unit retaining ring 16 to produce a leakproof closure. It is thus possible to proceed with the painting operation of the portion of the body of the automobile in the proximity of the headlight assembly without being concerned with paint being accidentally applied to the exposed surface of sealed beam unit 15. When the painting operation is completed, the headlight cover 9 is removed, and it will be noticed that no paint has leaked or has been applied to the exposed surface of the sealed beam unit 15.

Figure 6:
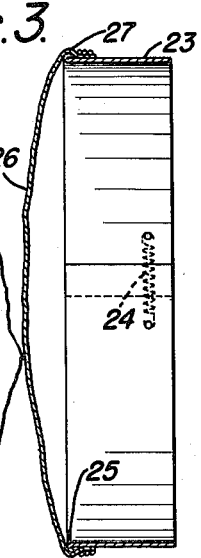
Figure 6 is a cross-sectional side view of a modified form of the novel device.
Figure 7:
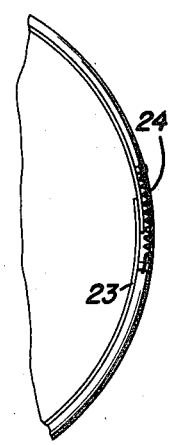
Figure 7 is a fragmentary bottom view of the modified form shown in Figure 6.

A modified form of the novel device, as shown in Figure 6, comprises a circular split wall 23, the confronting ends of which are connected together by means of a spring 24. The confronting ends of the wall 23 are disposed in a somewhat overlapping relation. One peripheral edge of the wall 23 is provided with a lip portion 25. A circular convex flexible top 26 is carried by the split wall 23. The peripheral edge of the top 26 has inward turned portions 27, which are frictionally engaged by means of the lip portion 25 of the wall 23. It is, therefore, apparent that this form of the invention may be applied to various headlight assemblies even though the diameters of the unit retaining rings may be different. The split wall 23 and the spring 24 afford an automatic adjustment to accommodate different sized retaining rings. Further, the overlapping arrangement of the confronting ends of the wall 23 insure that paint will not be sprayed into the device so as to contact the sealed beam unit. It should also be noted that since the top 26 is not integral with the wall 23, the top 26 is free to expand and contract to accommodate various diameters of sealed beam units and retaining rings.

Having thus described our invention, we claim:

1. A covering device for the sealed beam unit of an automobile headlight assembly, including a unit retaining ring, said device comprising a circular convex top having a configuration complemental to the exposed surface of said sealed beam unit, said top having a diameter substantially equal to the outside diameter of said unit retaining ring, a split side wall projecting from the peripheral edge of said top, the peripheral edge of said top overlapping the adjacent exterior edge of said side wall and operatively engaged to the latter, a spring means connecting the confronting ends of said split side wall together, whereby said covering device may be positioned with respect to said headlight assembly, so that said top is in contacting relation with respect to the exposed surface of said sealed beam unit and the inner surface of said side wall is in frictional engagement with the outer surface of said unit retaining ring.

2. A covering device for the sealed beam unit of an automobile headlight assembly, including a unit retaining ring, said device comprising a flexible circular convex top having a configuration complemental to the exposed surface of said sealed beam unit, said top having a diameter substantially equal to the outside diameter of said unit retaining ring, a split circular side wall positioned adjacent to the peripheral edge of said top, means carried by said top and said side wall for removably securing the latter together, the confronting ends of said side wall being disposed in a somewhat overlapping relation, a spring means connecting the confronting ends of said split side wall together, whereby said covering device may be positioned with respect to said headlight assembly, so that said top is in contacting relation with respect to the exposed surface of said sealed beam unit and the inner surface of said side wall is in tight frictional engagement with the outer surface of said unit retaining ring.

3. A covering device for the sealed beam unit of an automobile headlight assembly, including a unit retaining ring, said device comprising a flexible circular convex top having a configuration complemental to the exposed surface of said sealed beam unit, said top having a diameter substantially equal to the outside diameter of said unit retaining ring, a split circular side wall positioned adjacent to the peripheral edge of said top, the peripheral edge of said side wall adjacent to said top being provided with a lip portion, the peripheral edge of said top being provided with a turned-in portion for spring engagement with said lip portion, so as to removably secure said top and side wall together, the confronting ends of said side wall being disposed in a somewhat overlapping relation, a spring means connecting the confronting ends of said split side wall together, whereby said covering device may be positioned with respect to said headlight assembly, so that said top is in contacting relation with respect to the exposed surface of said sealed beam unit and the inner surface of said side wall is in tight frictional engagement with the outer surface of said unit retaining ring.

References Cited in the file of this patent

UNITED STATES PATENTS

| | | |
|---|---|---|
| 1,120,731 | McIlroy | Dec. 15, 1914 |
| 1,410,605 | Schact | Mar. 28, 1922 |
| 1,422,964 | Greenbaum | July 18, 1922 |
| 1,476,817 | Hatfield | Dec. 11, 1923 |
| 1,556,966 | Selig | Oct. 13, 1925 |
| 1,807,697 | Lyon | June 2, 1931 |
| 2,081,666 | Gunn | May 25, 1937 |
| 2,118,073 | Dittmeyer | May 24, 1938 |
| 2,264,703 | Lenz | Dec. 2, 1941 |
| 2,359,977 | Duggan | Oct. 10, 1944 |
| 2,523,930 | Unke | Sept. 26, 1950 |